United States Patent
Manookian, Jr.

(10) Patent No.: US 7,913,677 B2
(45) Date of Patent: Mar. 29, 2011

(54) CRANKCASE VAPOR PURIFICATION DEVICE

(76) Inventor: Arman Manookian, Jr., Oceanside, NY (US)

( * ) Notice: Subject to any disclaimer, the term of this patent is extended or adjusted under 35 U.S.C. 154(b) by 0 days.

(21) Appl. No.: 12/683,777

(22) Filed: Jan. 7, 2010

(65) Prior Publication Data

US 2010/0101546 A1   Apr. 29, 2010

Related U.S. Application Data

(63) Continuation of application No. 11/941,483, filed on Nov. 16, 2007, now Pat. No. 7,677,228.

(51) Int. Cl.
*B01D 19/00* (2006.01)
(52) U.S. Cl. ...................................................... 123/572
(58) Field of Classification Search .......... 123/572–574, 123/41.86
See application file for complete search history.

(56) References Cited

U.S. PATENT DOCUMENTS

| | | | | |
|---|---|---|---|---|
| 3,616,779 A | * | 11/1971 | Newkirk | 123/41.86 |
| 5,564,401 A | * | 10/1996 | Dickson | 123/573 |
| 5,586,996 A | * | 12/1996 | Manookian, Jr. | 55/321 |
| 6,279,555 B1 | * | 8/2001 | Crowell et al. | 123/572 |
| 7,677,228 B2 | * | 3/2010 | Manookian, Jr. | 123/572 |
| 2005/0092309 A1 | * | 5/2005 | Bedkowski et al. | 123/572 |

* cited by examiner

*Primary Examiner* — M. McMahon
(74) *Attorney, Agent, or Firm* — Hoffmann & Baron, LLP

(57) ABSTRACT

A vapor purifier for oil recovery from and cleansing of deleterious matter carried by oil vapors in a crankcase of an internal combustion-type engine generally includes a coil member that can separate the oil from the vapors by passing the vapors over and/or through the coil member. As the vapors impinge upon the surface(s) of the coil member, oil in the blow-by vapors condenses thereon. The vapor purifier can include a flow equalization member to maintain a normal engine intake manifold pressure for driving modes of the engine. As a result, the vapor purifier of the present invention can maintain the air to fuel stoichiometric ratio of the engine system. Additional components, such as filters and/or disks can also be included in the vapor purifier to promote oil recovery and cleansing of deleterious matter from the vapors, which act as a host for the deleterious matter.

21 Claims, 8 Drawing Sheets

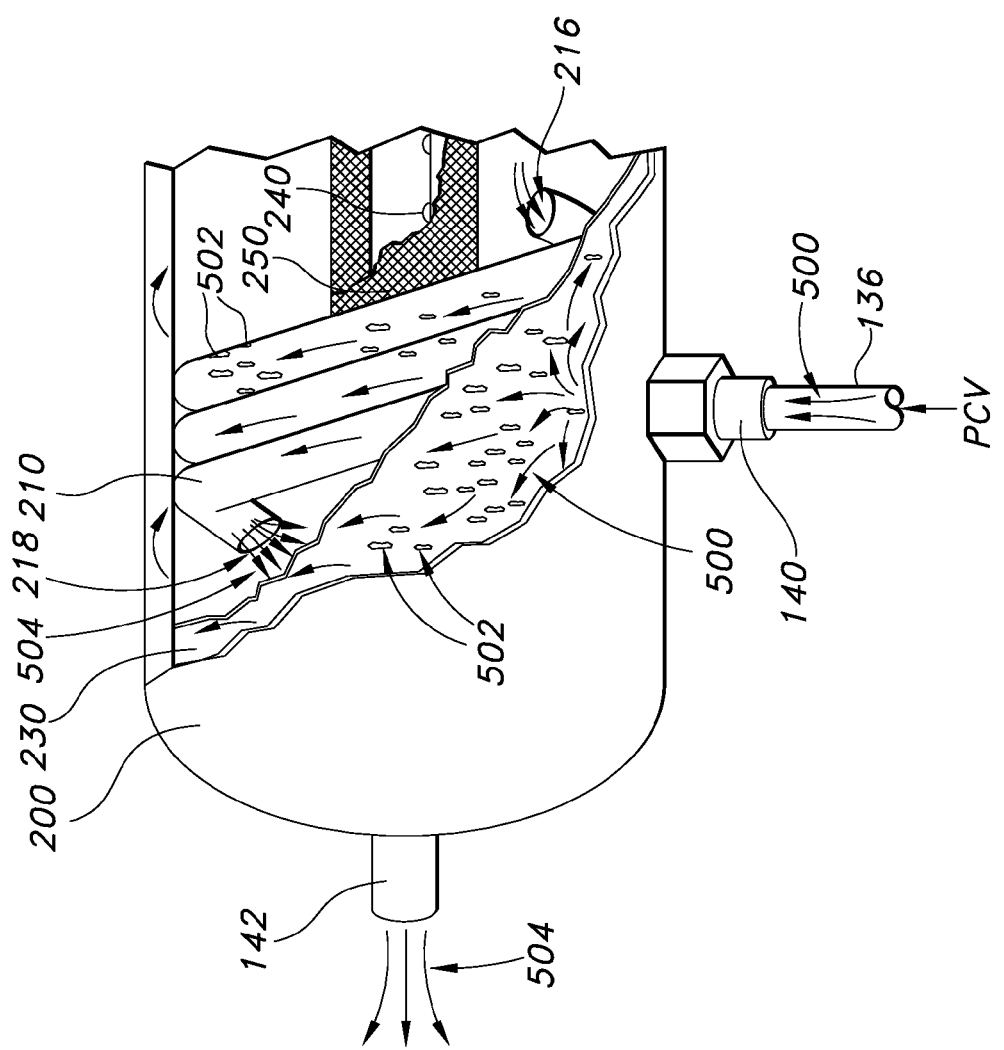

CRANKCASE VAPOR PURIFICATION DEVICE

This application is a continuation of U.S. patent application Ser. No. 11/941,483, filed on Nov. 16, 2007, which is incorporated by reference herein in its entirety.

FIELD OF THE INVENTION

The present invention relates to cleansing vapors of an automotive Positive Crankcase Ventilation (PCV) system for an engine, and more specifically, to a vapor purifier for cleansing vapors of the PCV system prior to being reintroduced into the engine for combustion.

BACKGROUND

Internal combustion-type engines mix controlled quantities of filtered air and fuel. The resultant mixture is fed to an interior of an intake manifold, from which it is distributed to a cylinder for combustion. During compression of the fuel-air mixture by the piston in a particular cylinder, certain quantities of blow-by carbonaceous particles and gases leak into the crankcase past the piston rings of the engine and become trapped therein with contaminants, such as oil vapors emitted by heated engine-lubricating oil.

Modern automobile engines have been equipped with a positive crankcase ventilation (PCV) system which is disposed in an oil and oil vapor recirculation line connecting the crankcase and the intake manifold. This allows the engines to recycle the contaminated oil and oil vapors back into the combustion chamber. In such a system, a stream of fresh air is directed into the engine interior wherein it re-circulates, picking up the vapors therein. The contaminated oil and oil vapors then leave the crankcase through a PCV valve and are conducted by conduit means to the intake manifold, where the dirty oil and oil vapors mix with the fuel-air mixture and are distributed to the cylinders for combustion.

It has been recognized that the oil and other contaminants mixing with the hot vapors in the crankcase and, thereafter, reaching the intake manifold and combustion cylinders, has a number of undesirable effects on engine performance. These undesirable effects can include, but are not limited accumulation of non-combustible residues on engine intake and exhaust valves; increased exhaust emissions and decreased fuel mileage due to incomplete combustion; which can be caused by dilution and contamination of the air and fuel; and the necessity of enriching the fuel-air mixture to off-set the loss of power therefrom.

Due to the advent of the new alternative fuels used in automotive engines, i.e. such as E-85 and compressed natural gas, it is ever more important to prevent the intermixing of the contaminating PCV oil and oil vapors with these lesser BTU fuels.

In addition, additives, such as detergents, are typically added to fuel. Such additives are used to clean deposits off of internal parts of the engine, such as the intake and exhaust valves. Some of these deposits may be a direct result of re-introducing the contaminating oil and oil vapors with a conventional PCV system and/or from other particulates that hinder the combustion process. The use of additives to break down these deposits may result in additional exhaust emissions being fed into the combustion process What is needed is an improved system for reducing and/or eliminating contaminates, such as oil, carbonaceous material, etc., from the dirty oil and oil vapors to provide cleansed air to be remixed with fuel for combustion. In addition, a more efficient system is needed for maintaining an engine air/fuel stoichiometric ratio by maintaining normal intake manifold pressure during various acceleration and deceleration modes.

SUMMARY OF THE INVENTION

The present invention is directed to a device for removing deleterious matter from vapors of a PCV system in a combustion engine. The device can include a canister and a coil member. The canister has an inlet port for the intake of the vapors from the engine and a cleansed air outlet port for connection to a vacuum source, such as the engine intake manifold. The vacuum source causes the vapors to be drawn through the canister via the inlet port. The coil member is supported within the canister and the oil vapors that are drawn into the canister impinge upon the coil so that oil in the vapors condenses thereon, and therein.

The present invention is directed to an engine system. The engine system includes a crankcase, an intake manifold, PCV system and a vapor purifier for purifying vapors of deleterious matter. The crankcase oil holds dirty trapped blow-by carbonaceous particulates and gases. The intake manifold draws the dirty oil and other deleterious matter in the vapors from the crankcase. The vapor purifier is configured to receive the dirty oil and vapors drawn from the crankcase and to output cleansed air to the intake manifold. The vapor purifier has a coil member disposed therein and upon which the dirty oil and vapors impinge so that oil in the vapors condenses thereon and therein.

The device preferably includes a sleeve disposed between an inner surface of the canister and the coil member. The sleeve at least partially surrounds the coil. When vapors hosting deleterious matter are drawn through the inlet port of the canister, the vapors impinge upon the sleeve so that oil in the vapors condenses thereon. The device can include a second coil member supported within the canister upon which the vapors impinge so that oil in the vapors condenses thereon The device preferably includes at least one filter body disposed within the canister and formed of material that is permeable to gas, but impermeable to oil. Dirty oil and vapors hosting deleterious matter that are drawn into the canister pass through the filter body. The at least one filter body is also preferably formed from a material that removes deleterious matter, such as carbonaceous materials, from the vapors.

The coil member preferably has a helical tubular structure with an internal surface and an external surface. The tubular structure has an entry point through which the vapors are drawn and an exit point out of which at least some of the vapors flow. The vapors are drawn through the entry point and impinge upon the internal surface of the tubular structure so that oil in the vapors condenses thereon. The coil member is includes at least one drainage opening extending between the internal surface and the external surface through which oil leaks out of the coil member.

The device preferably includes filter body disposed within the canister and at least partially surrounded by the coil member. The filter body is preferably formed of material permeable to gas and impermeable to oil. Vapors drawn into the canister pass through the at least one filter body.

The device preferably includes annular sealing disk(s) being disposed adjacent to one or more of the filter bodies. The disks conduct heat away from the outer condensing sleeve. Also, a disk on each end of the filter body can act as a vacuum seal, to prevent the by-pass of the dirty oil vapors/oil of the filter core. The two disks can be coated with an adhesive, such as High-Temp Red RTV Silicone Gasket Maker.

The device can include a tubular member extending from a proximate end of the sealed canister to a distal end of the sealed canister. The tubular member is formed with a surface through which at least some of the vapors flow.

The device preferably includes a flow equalization member for maintaining an air to fuel stoichiometric ratio to prevent excessive air flow through the device. The flow equalization member connects to the inlet port and has openings disposed thereon and through which at least some of the vapors are drawn. The member can be vacuum capped on the distal end. The flow equalization member has a diameter of about that of an inner diameter of a PCV valve connecting the inlet port to the PCV system, to compensate for the larger volumetric area of the device.

The device can also include a cooling mechanism for cooling the device relative to the vapors.

The present invention is directed to a method of removing deleterious matter from vapors of an engine in a Positive Crankcase Ventilation (PCV) system that host deleterious matter. The method includes drawing the vapors that host deleterious matter into a vapor purifier. The oil and vapors impinge upon a coil member in the vapor purifier. The method also includes condensing oil in the vapors on the coil member when the vapors impinge upon the coil member to cleanse the vapors and draining the oil from the vapor purifier back into a crankcase of the engine for reuse. The method further includes pulling the cleansed air from the vapor purifier, where the cleansed air is mixed with fuel for combustion.

The method preferably includes pulling the vapors through the coil member based on an indirect vacuum effect and impinging the vapors upon an internal surface of the coil member so that oil in the vapors condenses on the internal surface.

The method preferably includes controlling a normal engine intake manifold pressure to maintain a stoichiometric ratio of air to fuel for combustion, via the device air flow equalization member.

The method can also include pulling the vapors through at least one filter body disposed in the vapor purifier. The at least one filter body is formed of material permeable to gas and impermeable to oil.

The preferred embodiments of the vapor purification device, as well as other objects, features and advantages of the present invention will be apparent from the following detailed description, which is to be read in conjunction with the accompanying drawings. The scope of the invention will be pointed out in the claims.

BRIEF DESCRIPTION OF THE DRAWINGS

FIG. 5 depicts a cut-away view of an assembled vapor purifier in accordance with a preferred embodiment of the present invention;

DETAILED DESCRIPTION OF PREFERRED EMBODIMENTS

Preferred embodiments of the present invention involve a vapor purifier that enables improved oil recovery from and improved cleansing of vapors in the crankcase of an internal combustion-type engine. The vapors host deleterious matter, such as oil, oil vapors, carbonaceous particulates, blow-by contaminates and other matter that can degrade the engine and emission performance of a combustion engine. The vapor purifier generally includes a coil member that separates the oil from the vapors. This can be achieved by passing the vapors over and/or through the coil member. As the vapors impinge upon the surface(s) of the coil member, oil in the vapors condenses thereon and therein. The recovered oil can be returned to the crankcase of the engine, via the PCV valve port or by other mechanisms and/or cleansed air resulting, at least in part, from the condensation can be mixed with fuel for combustion.

In a preferred embodiment, the vapor purifier includes a flow equalization member to maintain a normal engine intake manifold pressure for driving modes of the engine. As a result, the vapor purifier of the present invention can maintain the air to fuel stoichiometric ratio of the engine system.

The term "stoichiometric ratio" is understood by those skilled in the art to generally refer to a particular air to fuel ratio that is specified for complete combustion of the fuel resulting in the by-products of carbon dioxide and water. The stoichiometric ratio can vary depending on various conditions, such as whether the engine is idling, accelerating, decelerating, operating with a light load, etc. The stoichiometric ratio can be set so that the amount of carbon monoxide in the exhaust is minimized, while the amount of carbon dioxide is maximized. For air to fuel ratios that are less (richer) than the stoichiometric ratio (i.e. too little air and/or too much fuel) an incomplete combustion can result due to a lack of oxygen. A richer air to fuel ratio can result in an increased level of carbon monoxide and a decreased carbon dioxide in the exhaust. A richer air to fuel ratio can also result in a loss in fuel economy and generally poor engine performance. Excess oxygen can appear in the exhaust for air to fuel ratios that are greater (weaker) than the stoichiometric ratio (i.e. too much air and/or too little fuel). A weaker air to fuel ratio can also cause generally poor engine performance and in some instance can prevent the engine from running.

The vapor purifier can be constructed of inexpensive, commercially available components, can be factory installed on Original Equipment Manufacture (OEM) engines, and/or may be retrofitted to currently available engines, by those skilled in the art.

Figure 1:
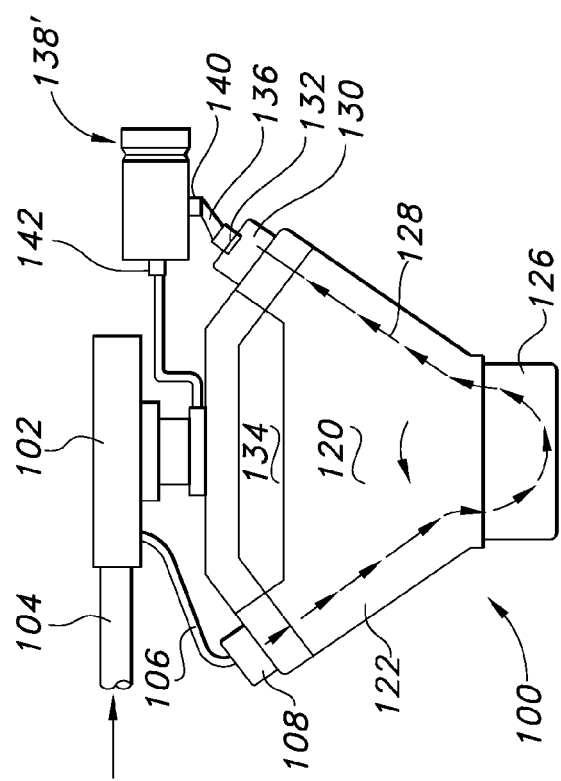
FIG. 1 is a schematic illustration of a V-type engine incorporating a two port vapor purifier in accordance with a preferred embodiment of the present invention.

FIG. 1 depicts a V-type gasoline-powered engine 100 interconnected with a vapor purifier 138' of the present invention. Air flowing into the air filter 102 through the intake duct 104 is directed via a conduit 106 through an engine aperture 108 to the interior of a crankcase 120 in the engine block 122, passing first through an engine intake air filter cleaner. An oil pan 126 at the bottom of the block holds a volume of lubricating oil that is circulated throughout the crankcase 120.

As the engine 100 runs, the lubricating oil heats and emits oil vapors, which are trapped in the crankcase 120. Additionally, vapors consisting of an air-fuel mixture and deleterious matter, such as blow-by carbonaceous particles, escape into the crankcase 120 from the combustion chambers, mixing therein with trapped oil vapors. As shown by the arrows 128 in FIG. 1, fresh air entering the crankcase 120 at aperture 108 circulates therein and mixes with the trapped vapors. The blow-by vapors, and other deleterious matter, use the heavier hot oil vapors as its vehicle, exit engine block 122 at a discharge aperture 130, and pass thence through positive crankcase ventilating (PCV) valve 132. The direction of flow is defined by a vacuum present in the intake manifold 134 whenever the engine 100 is running. The vacuum of the intake manifold 134 circulates air through the engine 100. The vapors carrying deleterious matter, which includes the blow-by contaminates from crankcase 120, are channeled via a conduit 136 from PCV valve 132 to the vapor purifier 138' for cleansing the vapors of deleterious matter, as further described below.

The vapor purifier 138' preferably includes an inlet/drainage port 140 (hereinafter "inlet port 140") and an outlet port 142. The inlet port 140 connects to the PCV valve 132. In some embodiments, the inlet port 140 can connect to the PCV valve 132 via a conduit 136. In other embodiments, the inlet port 140 can connect directly to the PCV valve. When the engine first starts oil trapped in the conduit 136 can be initially drawn into the vapor purifier 138', but eventually can drain back to the engine 100. Vapors and deleterious matter in the vapors, which include the blow-by contaminates, are drawn from the engine 100 into the vapor purifier 138' through the inlet port 140. Oil recovered from the vapors by the vapor purifier 138' can drain back into the engine 100 through the inlet port 140. The vapor purifier 138' is preferably oriented so that the inlet port 140 has a generally downward orientation and so that the vapor purifier 138' is higher then the PCV valve of the engine 100 so that the oil in the vapor purifier 138' can drain into the engine as a result of gravity. The intake pressure that creates the vacuum effect in the vapor purifier 138' increases and decreases as the modes of the engine vary. During periods of decreased pressure, more oil may drain back into the engine than during periods of increased pressure. The outlet port 142 is connected to the intake manifold 134 via a conduit 150. The intake manifold 134 pulls cleansed air, which result from the operation of the vapor purifier 138', through the outlet port 142. The vapor purifier of the preferred embodiments has vacuum tight seals such that no vacuum leak down exists. To bench test a newly built two port device (e.g., inlet and outlet ports) for vacuum tight integrity, one port is blocked and the other is connected to a handheld vacuum pump. The pressure should be pumped up to about 20 pounds. The pressure should hold for about one minute with zero leak down. The test process for a three port device (e.g., inlet, outlet, and drainage port) is substantially identically except that two of the three ports are blocked.

Figure 2:
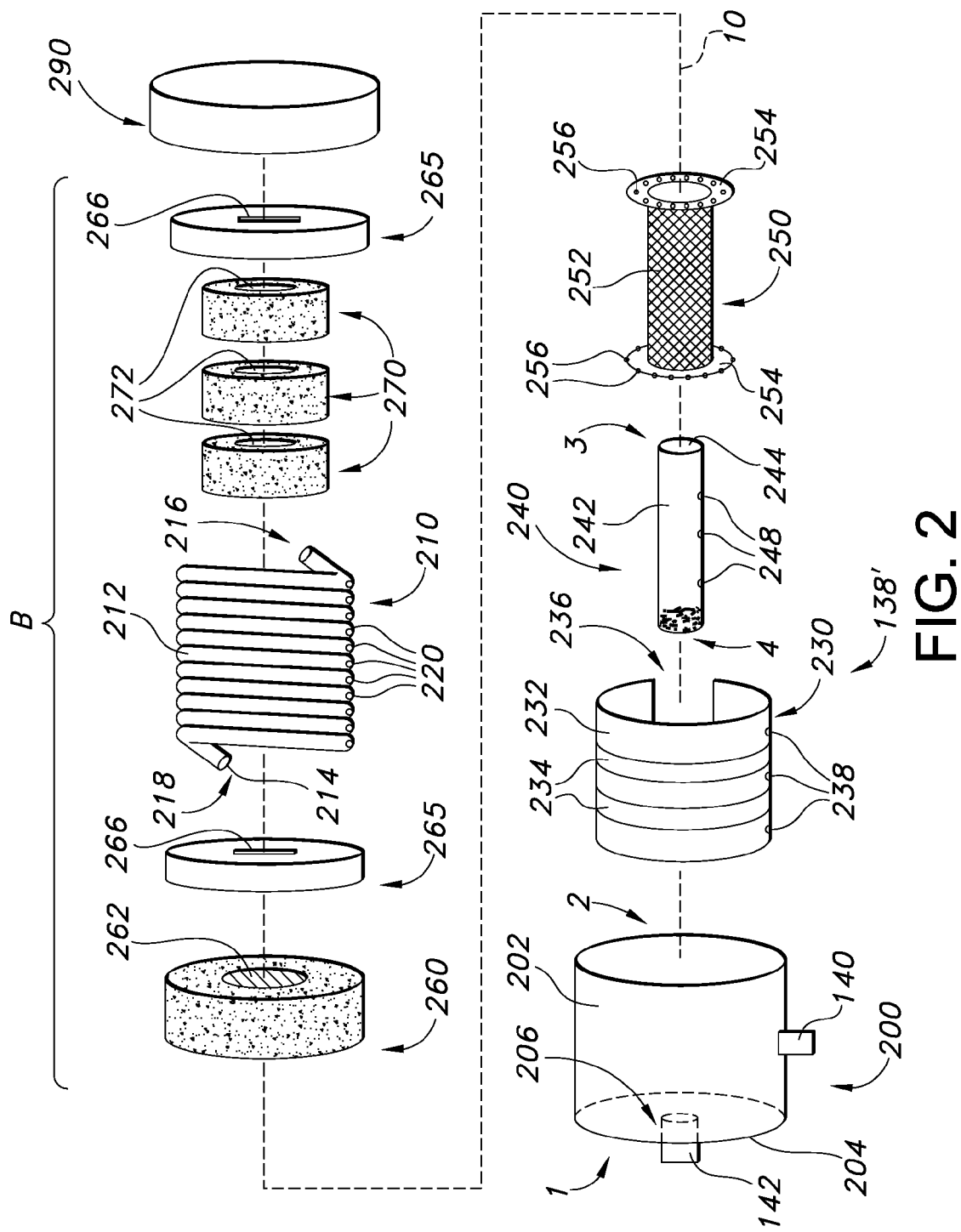
FIG. 2 depicts an exploded view arrangement of the components of a vapor purifier in accordance with a preferred embodiment of the present invention.

With reference to FIG. 2, the vapor purifier 138' generally includes a canister 200 and a coil member 210. As will be discussed in further detail below, the vapor purifier further preferably includes a sleeve member 230, a flow equalization member 240, a tubular member 250, a filter body 260, annular sealing disks 265, one or more filter bodies 270, and a vacuum tight seal cap 290.

The canister 200 preferably has a cylindrical configuration with a cylindrical surface 202 formed about a center axis 10 of the vapor purifier 138' and a first circumferential surface 204 formed at a proximate end 1. The canister 200 is preferably formed from a high-strength, non-corrosive steel material. A second circumferential surface is formed by the vacuum tight seal cap 290 vacuum tight seal at a distal end 2 of the canister 200. The outlet port 142 is disposed in the first surface 204 and is generally positioned orthogonally to the inlet/drainage port 140, which is disposed on and extends away from the cylindrical surface 202. The outlet port 142 can have a threaded section 206 which extends through the first circumferential surface 204 and into an interior of the canister 200. The threaded section 206 of the outlet port 142 is coupled to the flow equalization member 240, as discussed below. Alternatively, the outlet port 142 and the flow equalization member 240 may be manufactured as a single component.

The coil member 210 is preferably a continuous structure that is helically wound about the center axis 10 to form a longitudinally extending coil. The coil member 210 can be tightly wound to minimize the space between the loops of the coil member 210. The coil member 210 can be formed from a tubular structure that has an outer surface 212 and an inner surface 214. Thus, each end of the coil member 210 is open. For example, the coil member 210 has a vapor inlet opening 216 and a cleansed air outlet opening 218. The vapors, which carry deleterious matter, that are drawn into the vapor purifier 138' impinge upon the outer surface 212 of the coil member 210 at which point oil in the vapors can condense on the outer surface 212 of the coil member 210. Additionally, because the vapor purifier 138' is under negative pressure due to the suction of the intake manifold 134, the vapors are also drawn into the coil member 210 at the vapor inlet opening 216, wherein the vapors travel through the interior of the coil member 210. As the vapors travel through the coil member 210, the vapors are forced radially outward away from the center axis as a result of centrifugal force and impinge on the inner surface 214 of the coil member 210 at which point oil in the vapors condenses on the inner surface 214. Cleansed air is pulled from the cleansed air outlet opening 218. The coil member 210 preferably includes openings 220 so that oil that condenses on the inner surface 214 can drain from within the coil member 210. The coil member 210 is preferably formed of a metallic material, such as copper or aluminum.

The sleeve 230 is preferably formed in a cylindrical configuration having a diameter that is smaller than the diameter of the canister 200 so that the sleeve 230 fits within the canister 200 when the vapor purifier 138' is assembled. The sleeve 230 has a curved surface 232 and is preferably formed with a split sleeve configuration that is held fixedly in cylindrical form by one or more retaining bands 234. A longitudinally-extending slot 236 is formed in the sleeve 230 to create the split sleeve configuration. The sleeve 230 is provided with openings 238 disposed on the curved surface 232. The openings are preferably displaced from the slot 236 by about 90 degrees. The sleeve 230 preferably fits within the canister 200 so that a space remains between the interior surface of the canister 200 and the sleeve 230. The space provides a flow passage for the vapors being drawn through the inlet port 140. As a result, the vapors carrying deleterious matter flow over the curved surface 232 of the sleeve 230 and oil in the vapors condenses into liquid droplets as it impinges on the surface 232.

Preferably, the sleeve 230 is formed from thin gauge aluminum sheet metal, which inherently remains cooler and cools down faster relative to the other components of the vapor purifier 138' and engine compartment. The retaining bands 234 may be metal or plastic ties or wire fastened together or welded. In addition, it will be appreciated that by bringing the cable or wire ends or weld into contact with the internal surface of the canister 200, a grounding means can be provided for the entire vapor purifier 138' against any static electricity that can accumulate. Ridding the vapor purifier 138' of this static electricity can greatly reduce the resistance of the natural vacuum and condensed oil flow over the sleeve 230.

The flow equalization member 240 (hereinafter "member 240") preferably has a cylindrical configuration with a cylindrical surface 242 and a wall 244 at a distal end 3 of the member 240. The wall 244 provides a vacuum tight seal at the distal end 3 of the member 240. In some embodiments, the wall 244 can be formed from a vacuum tight seal cap. The proximate end 4 of the member 240 preferably has a threaded internal surface for engaging the threaded section 206 of the outlet port 142. Alternatively, a threaded connector can be coupled to the proximate end 4 of the member 240, which can engage the threaded section 246 of the outlet port 142. The member 240 has an inner diameter that is substantially equal to the inner diameter of the conduit 136 connecting the PCV valve 132 to the inlet port 140. For embodiments where the inlet port 140 connects directly to the PCV valve 132, the member 240 can have an inner diameter that is substantially equal to the inner diameter of the PCV valve. The member 240 has spaced openings 248 through which cleansed air is drawn as a result of the suction provided by the intake manifold 134. The member 240 is preferably formed from a generally non-corrosive metallic material, such as steel or aluminum.

By configuring the member 240 to have an inner diameter that is substantially equal to the inner diameter of the conduit 136, a change in suction by the intake manifold 134 during, for example, engine acceleration and deceleration does not cause an excessive air flow though the vapor purifier 138'. This allows the engine system to control the engine intake manifold pressure for driving modes of the engine 100. Using the member 240, the air flow and pressure within the vapor purifier 138' can be maintained to substantially equal the air flow and pressure through the intake manifold 134. A normal engine intake manifold pressure for driving modes of the engine can, therefore, be maintained by the member 240. Thus, the vapor purifier 138' can respond appropriately to sudden changes in suction that may occur due to, for example, an acceleration or deceleration of the engine 100. As a result, the air to fuel stoichiometric ratio of the engine 100 is maintained.

The tubular member 250 is preferably formed from a porous material 252, such as a wire mesh. The structure of the tubular member 250 permits the cleansed air to flow freely therethrough. In some embodiments, the core 250 may be a cylindrical hollow tube formed of, for example, a metal or plastic material provided with a number of spaced apertures. The tubular member 250 can have a diameter that is generally larger than the diameter of the member 250 so that when the vapor purifier 138' is assembled, the flow equalization member 250 fits within the tubular member 250.

The tubular member 250 can have disk-like sections 254 at each end. The disk-like sections 254 can provide a surface for affixing the tubular member 250 to the end surface 204 of the canister 200 and the sealing cap 290. The disk-like section 254 may provide support for securing the components of the vapor purifier 138' about the tubular member 250. The disk-like sections 254 are preferably affixed to the first circumferential surface 204 and the sealing cap 290 using an adhesive 256, such as an epoxy. Such an epoxy is preferably a marine-tex epoxy. In other embodiments, the tubular member 250 may not include the disk like sections 254. In such embodiments, filter bodies may be positioned at the proximate end 1 and the distal end 2 of the canister 200 and disk-like sections 254 can be affixed to the filter bodies and first circumferential surface 204 and the sealing cap 290 using an adhesive, as described above.

The filter body 260 is preferably formed of material which is permeable to air, but impermeable to oil. In a preferred embodiment, the filter body 260 is composed of wool, such as those filters used in the oil burner industry, by General Filters, Inc. although, other filtering materials, such as rayon, felt, or any other material which is permeable to air but offers resistance to the through-flow of oil is suitable.

The filter body 260 can have a generally cylindrical configuration with an opening 262 extending radially from the center axis 10 of the filter body 260. The diameter of the opening 262 is generally larger than the diameter of the tubular member so that the tubular member 250 can extend through the opening 262. The tubular member 250 prevents the filter body 260 from coming in contact with the member 240 when the vapor purifier 138' is assembled. The outer diameter of the filter body 260 is smaller than the diameter of the sleeve 230 so that when the vapor purifier 138' is assembled the curved surface 232 of the sleeve 230 can partially surround the filter body 260.

The annular sealing disks 265 (hereinafter "disks 265") are radially enlarged plates that can be positioned to abut flat against the ends of the filter bodies 265 and 270. In some embodiments, the annular disks can be adhered to the filter bodies 265 and 270. The disks 265 have an opening 266 extending radially about the center axis 10 of the disks 265. The diameter of the opening 266 is generally larger than the diameter of the tubular member 250 so that the tubular member 250 can extend through the opening 266. The outer diameter of the disks 265 is greater than the outer diameter of the filter body 260 so that the sleeve 230 is held away from the filter body 260. This helps to maintain the sleeve 230 to remain at relatively cooler temperature than the vapors to provide improved condensation of vapors by conducting heat away from the sleeve 230. The disks 265 are preferably formed from thin gauge aluminum sheet metal, which inherently stays cooler and cools down quickly. In some embodiments, one or more of the annular sealing disks 265 vacuum seal the coil member 210 to an internal surface of the canister 200. While the disks 265 are preferably formed from aluminum, those skilled in the art will recognize that other materials, such as plastic, might be used.

The one or more filter bodies 270 are preferably formed with the same material as the filter body 260. However, those skilled in the art will recognize that the filter body 260 and the one or more filter bodies 270 can be formed from different materials. The one or more filter bodies 270 can have a cylindrical configuration with openings 272 extending radially from a center axis of the one or more filter bodies 270. The diameter of the openings 272 is generally larger than the diameter of the tubular member 250 so that the tubular member 250 can extend through the opening 272. The tubular member 250 prevents the one or more filter bodies 270 from coming in contact with the member 240 when the vapor purifier 138' is assembled. The outer diameter of the one or more filter bodies 270 can be smaller than the diameter of the coil member 210 so that when the vapor purifier 138' is assembled the one or more filter bodies 270 can fit within the coil member 210. The one or more filter bodies 270 are preferably arranged to one another so that the one or more filter bodies extend the length of the coil member 210.

The vacuum tight seal cap 290 (hereinafter "seal cap 290") is affixed to the canister 200 to seal the components of the vapor purifier in the canister 200. The seal cap 290 is affixed to the canister 200 to provide a vacuum tight seal by, for example, soldering, welding, adhering, etc., the seal cap 290 to the distal end 2 of the canister 200. Adhesion of the seal cap 290 to the distal end 2 of the canister 200 can be achieved using an adhesive, such as a marine-tex epoxy.

Figure 3:
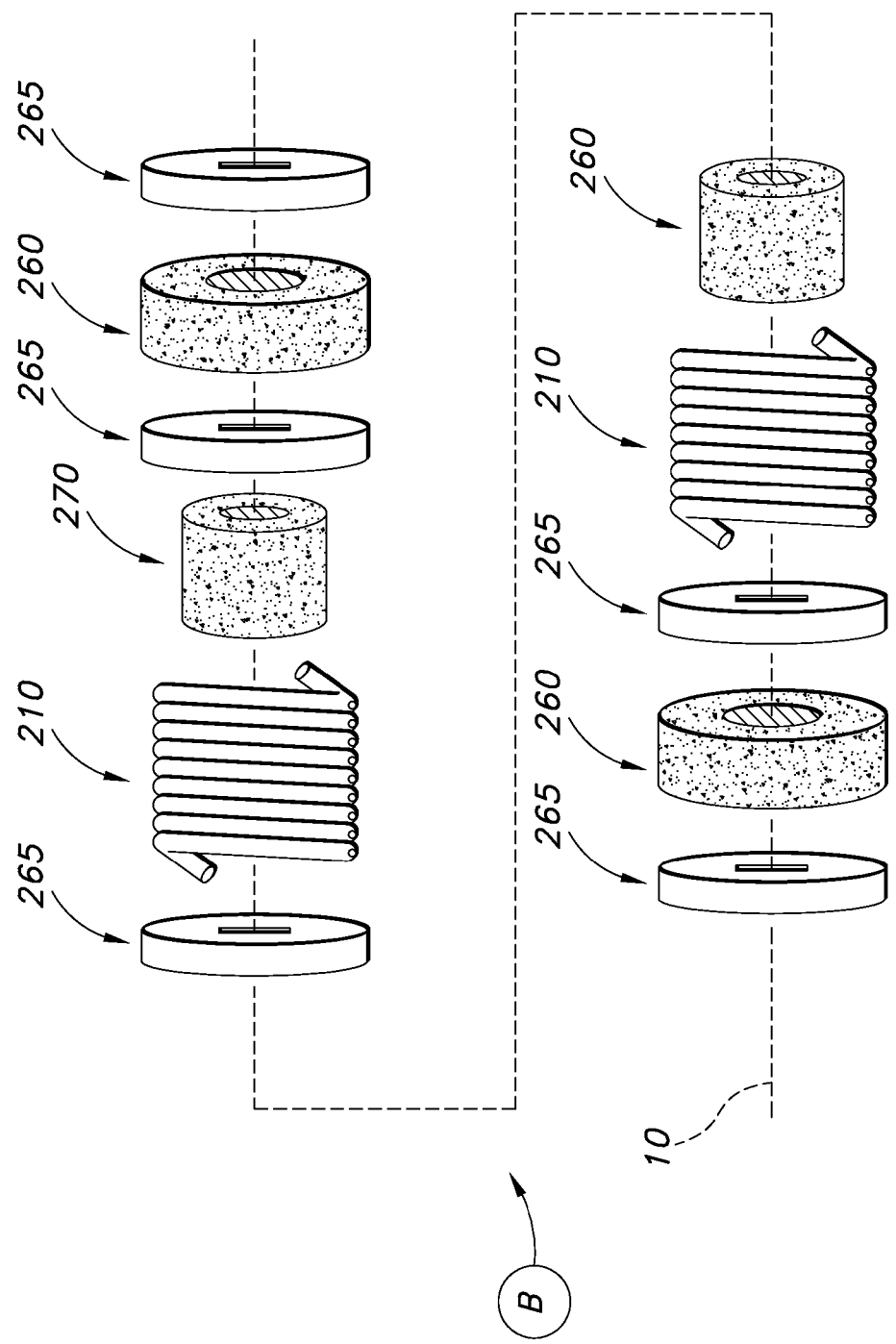
FIG. 3 depicts an exploded view of an alternative arrangement of some of the components in the vapor purifier.

FIG. 3 depicts an alternative arrangement for the section "B" components depicted in FIG. 2. The section B components can include multiple filter bodies 260, disks 265, coil members 210, and filter bodies 270 longitudinally arranged in a sequential pattern. In this embodiment, each of the coil members 210, filter bodies 260, and filter bodies 270 are bounded by one of the disks 265. Additionally, each of the coil members 210 surround one of the filter bodies 270.

Figure 4:
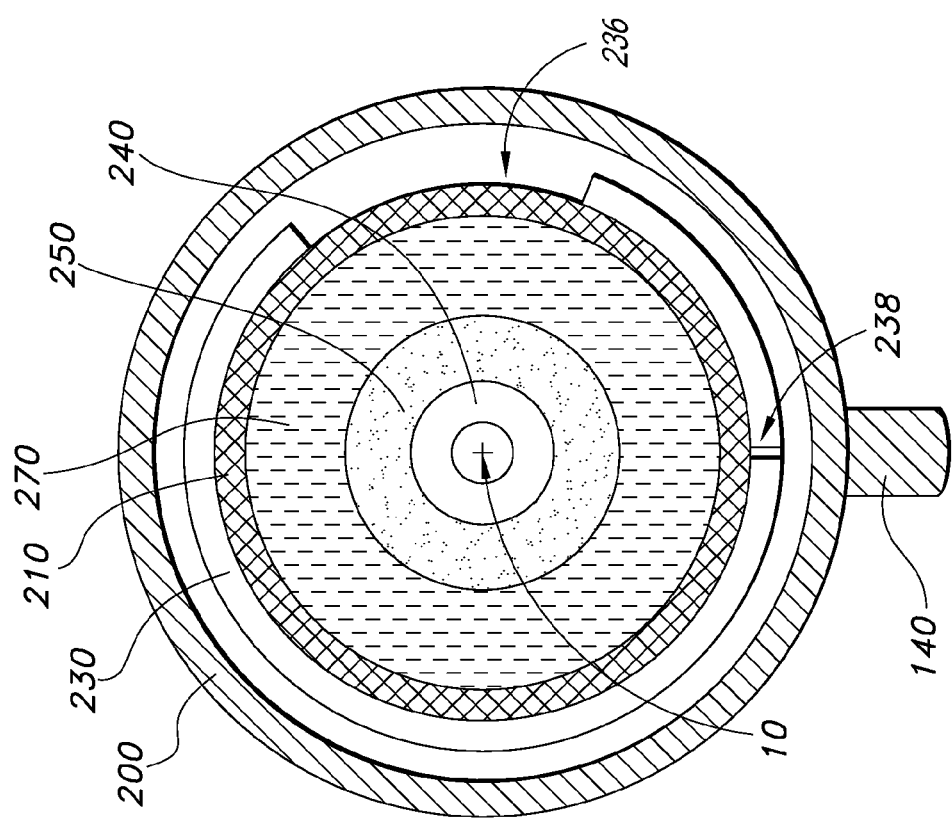
FIG. 4 depicts a cross-sectional view of the vapor purifier depicted in FIG. 1A.

FIGS. 4 and 5 depict the vapor purifier 138' in an assembled form. FIG. 4 depicts a cross-sectional view of the assembled vapor purifier 138'. The filter body 260, disks 265, and seal cap 290 have been excluded from FIG. 4 for clarity. FIG. 5 depicts a perspective cut-away view of the assembled vapor purifier 138'. The filter bodies 260 and 270, disks 265 and sealing cap 290 have been excluded from FIG. 5 for clarity.

With reference to FIG. 4, the members 210, 230, 240, 250, and 270 are nested within the canister 200, where each member is centered about the center axis 10. The sleeve member 230 is positioned between the inner surface of the canister 200 and the coil member 210. The coil member 210 is positioned between the sleeve member 230 and the filter member 270, which in turn is positioned between the coil member 210 and the tubular member 250. The tubular member 250 is nested between the filter bodies 270 and the member 240.

The sleeve 230 is preferably oriented so that the slot 236 is positioned about 90 degrees from the inlet port 140 to prevent the vapors that host deleterious matter from by-passing the sleeve 230. The openings 238 in the sleeve 230 are preferably axially aligned at substantially the same orientation as the inlet port 140 to allow condensed oil to drain, as a result of gravity, through the sleeve 230 to the engine 100 via the inlet port 140 and the PCV valve 132.

Referring still to FIGS. 4 and 5, in operation the vapor purifier 138' draws vapors 500 that host deleterious matter through the inlet port 140 as result of the suction from the intake manifold 134 at the outlet port 142. Subsequently, the vapors 500 impinge on the sleeve 230 on which oil 502 in the vapors begin to condense. The vapors 500 continue to flow around the sleeve 230 until they reach the slot 236 of the sleeve 230 at which point some of the vapors 500 impinge the outer surface 212 of the coil member 218, whereupon oil in the vapors 500 condenses. Partially cleansed air 504 resulting, at least in part, from the condensation of oil 502 can then be drawn radially inward towards the member 240 through the filter bodies 260 and 270 (not shown in FIG. 5) where the vapors can be further cleansed to reduce and/or remove remaining deleterious mater, such as oil remaining in the vapors 500, carbonaceous particulates, and/or other materials.

Additionally, some of the vapors 500 are drawn into the coil member 210 via inlet opening 216 due to an indirect suction at the outlet opening 218 as a result of the suction generated in the vapor purifier 138' by the intake manifold 134. The vapors 500 travel through the coil of the coil member 210 during which oil 502 in the vapors 500 impinge on the inner surface 214 of the coil member 210 causing oil 502 in the vapors 500 to condense thereon. Cleansed air 504 resulting from the condensation flows out of the outlet opening 218 of the coil member 210 and is subsequently drawn radially inward through the one or more filter bodies 270 (not shown in FIG. 5), the tubular member 250, member 240, and outlet port 140 towards the intake manifold 134. The filter bodies 226 and 270 can further filter remaining deleterious matter.

Figure 6:
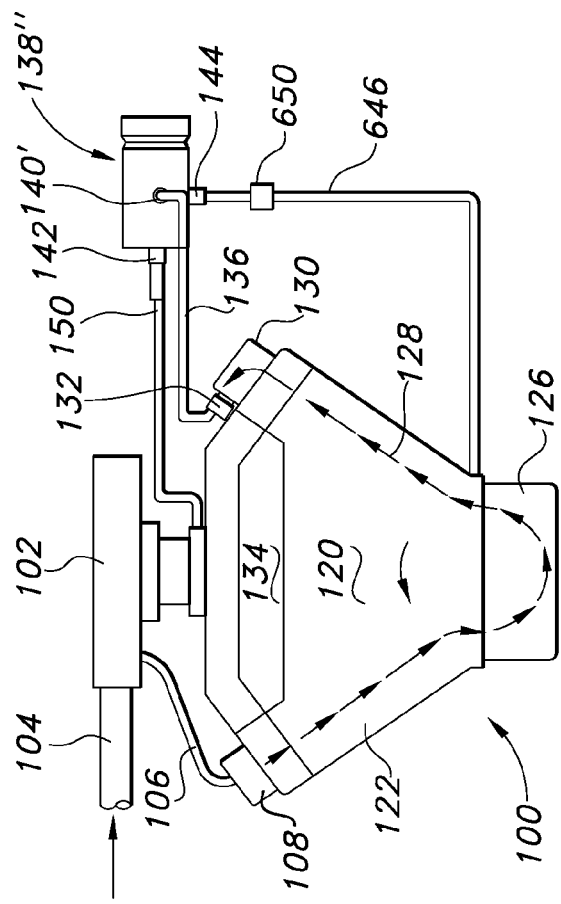
FIG. 6 is a schematic illustration of a V-type engine incorporating a three port vapor purifier in accordance with an alternative embodiment of the present invention.

FIG. 6 depicts an alternative embodiment of a vapor purifier 138" in accordance with the present invention. The vapor purifier 138" of FIG. 6 can be formed with identical components and with minor modifications to the vapor purifier 138'. The vapor purifier 138" includes three ports: an inlet 140; an outlet 142; and a separate drainage port 144 instead of two ports (i.e., an inlet/drainage port 140 and an outlet port 142).

The vapor purifier 138" operates in a similar manner as the vapor purifier 138'. Vapors in the engine 100 that include deleterious matter are pulled through the PCV valve and the inlet port 140' into the vapor purifier 138". Recovered oil drains back into the engine 100 via the drainage port 144 which may connect to the engine 100 via conduit 646. Cleansed air vapors are pulled by the intake manifold 134 from the vapor purifier 138" through the outlet port 142 via conduit 150.

A valve mechanism 650 can be used to control the drainage of oil from the vapor purifier 138" to the engine 100. During engine operation, the valve mechanism 650 is sucked closed to prevent oil from draining from the vapor purifier 138" and to maintain normal intake manifold pressures. During engine off periods, the valve mechanism 650 opens during engine off periods to allow the oil collected in the vapor purifier 138" to drain back to the crankcase.

Figure 7:
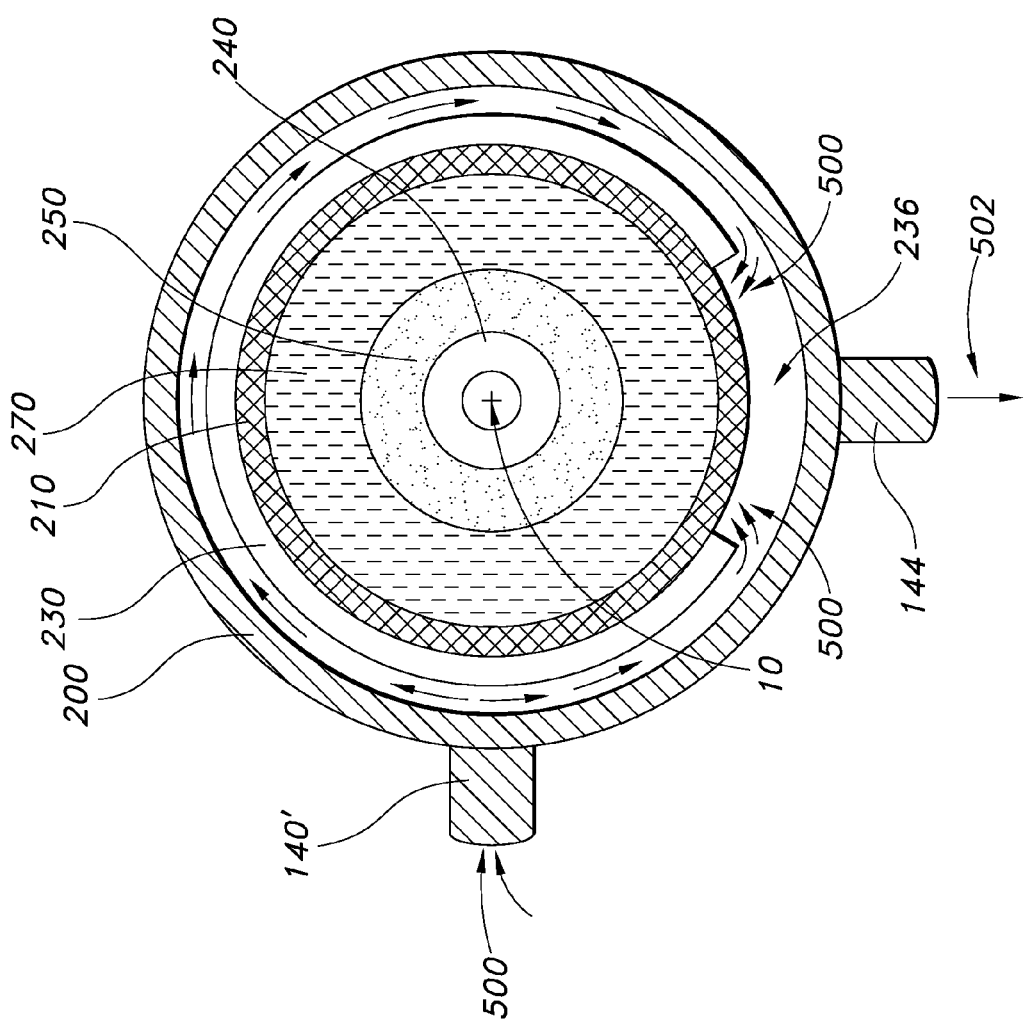
FIG. 7 a cross-sectional view of the vapor purifier depicted in FIG. 6.

FIG. 7 depicts a cross-sectional view of the arrangement of components in the vapor purifier 138". The filter body 260, disks 265, and seal cap 290 have been excluded from FIG. 7 for clarity. The members 210, 230, 240, 250, and 270 are nested within the canister 200, where the members are centered about the center axis 10. The sleeve member 230 is positioned between the inner surface of the canister 200 and the coil member 210. The coil member 210 is positioned between the sleeve member 230 and the one or more filter bodies 270, which in turn is positioned between the coil member 210 and the tubular member 250. The tubular member 250 is nested between the one or more filter bodies 270 and the member 240.

The sleeve 230 is preferably oriented so that the slot 236 is arranged at substantially the same orientation as the drainage port 144 to allow the vapors carrying deleterious matter to flow around the sleeve 230 and to allow condensed oil to drain from the drainage port 144. Additionally, the sleeve 236 may or may not include openings 238, as discussed above with reference to the vapor purifier 138'. Otherwise, the vapor purifier 138" is configured and functions in an identical manner as the vapor purifier 138'.

For example, vapors 500 are drawn into the vapor purifier 138" via the inlet port 140'. The vapors flow around and impinge upon the sleeve 230. As the vapors 500 impinge upon the sleeve 230, oil in the vapors 500 condense on the sleeve. The vapors 500 flow through the slot 236 and impinge upon and flow through the coil member 210, during which oil 502 in the vapors 500 condense on the coil member 210. The vapors 500 continue to flow inward towards the openings 246 of the member 240, passing through the one or more filter bodies 270 and the tubular member 250. The one or more filter bodies 270 remove remaining deleterious matter, such as oil 502 in the vapors 500, carbonaceous particulates, and/or other particulates from the vapors. The recovered oil 502 flows from the sleeve 230, and the components partially surrounded by the sleeve, to the drainage port 144. The recovered oil 502 drains from the coil member 210 and one or more filter bodies 270 to the drainage port 144 through the slot 236.

In another embodiment, the sleeve 230 in the vapor purifier 138" can have an identical configuration and orientation as the sleeve 230 in the vapor purifier 138' and can include the openings 232 to allow condensed oil to drain from the interior of the sleeve 230. Thus, the vapor purifier 138' and 138" can have an identical configuration and function with the exception of the number of ports.

Figure 8:
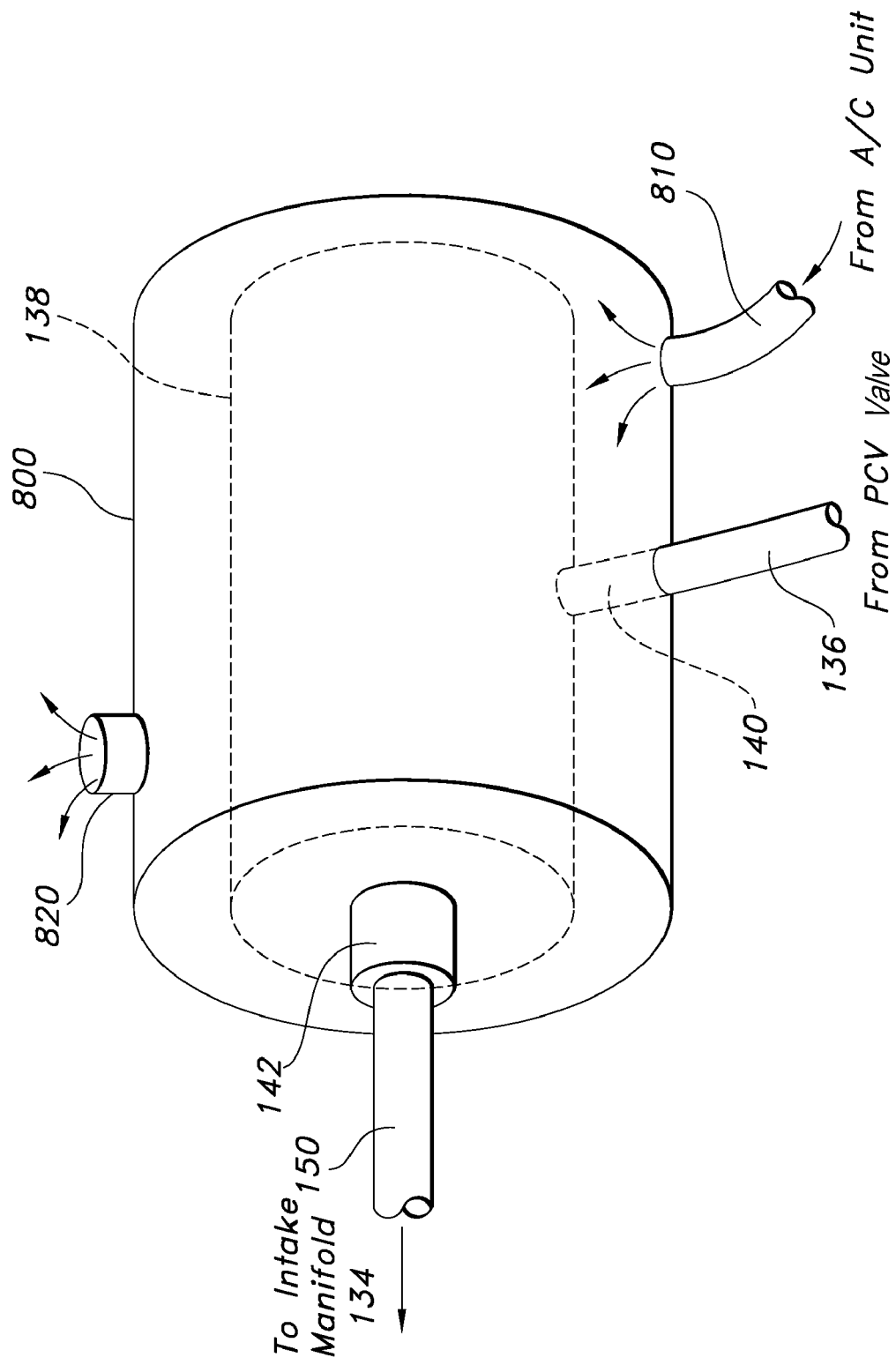
FIG. 8 depicts a preferred embodiment of a cooling mechanism for the vapor purifier in accordance with the present invention.

In some embodiments, the vapor purifier 138 (e.g., vapor purifiers 138' and 138") can include a cooling mechanism to promote condensation of oil in the vapors. FIG. 8 depicts the vapor purifier 138, where the vapor purifier 138 is at least partially surround by an insulated jacket 800. The insulated jacket 800 connects to an air conditioning unit of an automobile via conduit 810, which is also preferably insulated. The air conditioning unit pumps cooled air through the conduit 810 to the vapor purifier 138. A space may be provided between the jacket 800 and the surface of the vapor purifier to allow the cooled air to circulate. The jacket 800 can also include an opening 820 or other mechanism to provide an exhaust for air that has been heated as a result of an operating temperature of the vapor purifier 138. By cooling the vapor purifier 138, an increased amount of condensation can be generated to further cleanse the vapors received by the vapor purifier 138. The internal temperature of the jacket can be thermostat controlled, to maintain a device temperature of approximately 15°-20° below the engine compartment temperature. A thermostat differential for providing an acceptable range about a desired internal temperature of the jacket can be, for example, approximately 2.5°-5° about the desired temperature.

Figure 9:
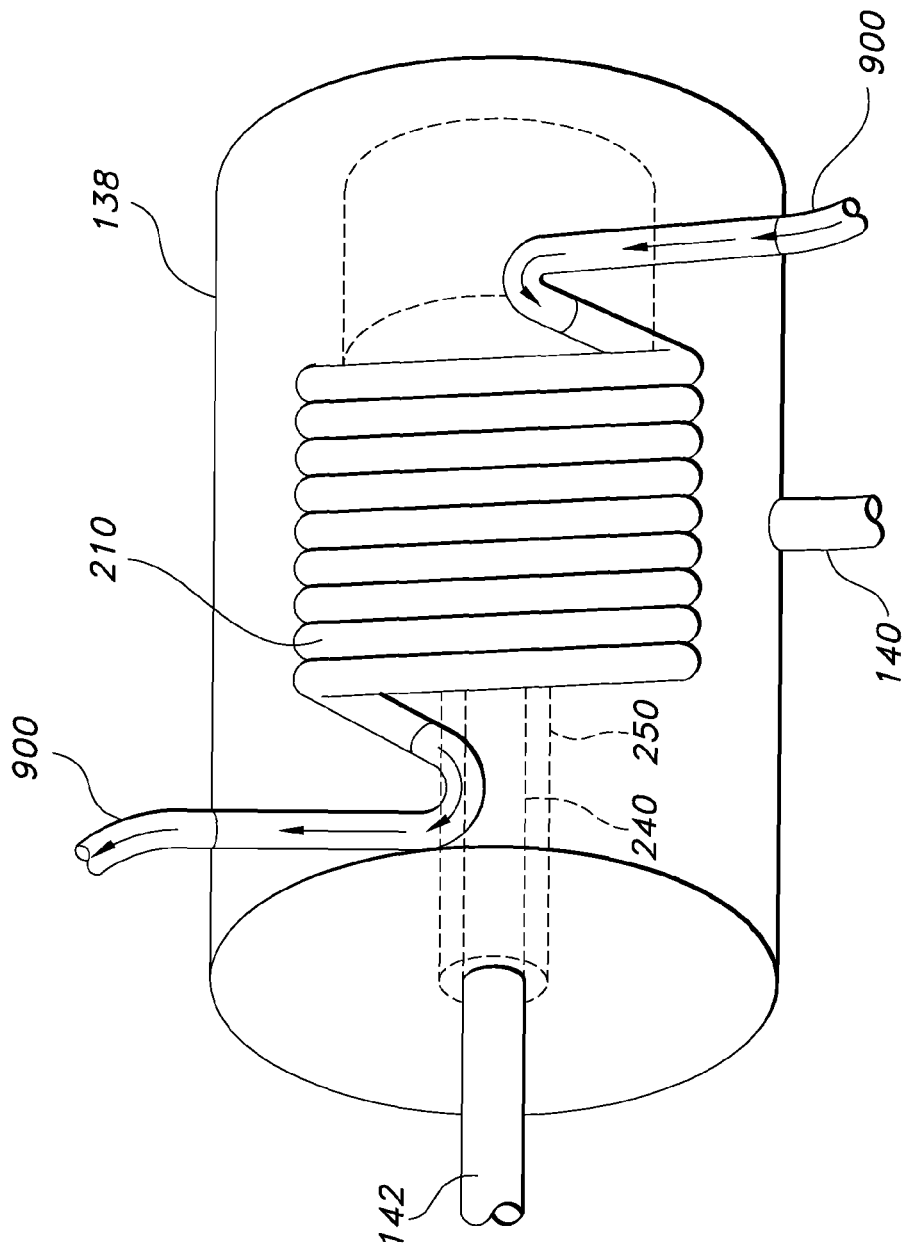
FIG. 9 depicts another preferred embodiment of a cooling mechanism for the vapor purifier in accordance with the present invention

In some embodiments, the vapor purifier 138 can include the coil member 210 through which a conduit from the air conditioning unit can be routed. With reference to FIG. 9, the conduit 900 can enter one end of the coil member 210 and exit the other end of the coil member. Openings in the canisters can be formed for the conduit 900 to pass through. A refrigerant, such as Freon or other Freon substitutes can flow through the conduit to keep the coil member 210 at a cooled temperature. Vapors hosting deleterious matter can impinge directly on the surface of the coil member 210.

Having described the preferred embodiments herein, it should now be appreciated that variations may be made thereto without departing from the contemplated scope of the invention. Accordingly, the preferred embodiments described herein are deemed illustrative rather than limiting, the true scope of the invention being set forth in the claims appended hereto.

What is claimed is:

1. A device for removing deleterious matter from vapors of a combustion engine, the device comprising:
    a canister having an inlet port communicating with an interior of the canister for intake of the vapors from a combustion engine into the interior of the canister and an outlet port for connection to a vacuum source that causes the vapors to be drawn through the canister via the inlet port; and
    a coil member supported within the canister, the coil member having a tubular structure with an internal surface and an external surface, the tubular structure having an entry point through which the vapors are drawn and an exit point out of which at least some of the vapors flow, the entry point and the exit point being in communication with the interior of the canister and being spaced apart from the inlet port, wherein the vapors drawn into the interior of the canister impinge on an external surface of the coil and condense thereon.

2. The device of claim 1, wherein the coil member is configured so that at least a portion of the vapors drawn into the interior of the canister flow through the entry point of the coil member and impinge upon the internal surface of the coil member to condense oil in the vapors thereon.

3. The device of claim 2, wherein the coil member further comprises:
    at least one drainage opening extending between the internal surface and the external surface through which oil leaks out of the coil member.

4. The device of claim 3, further comprising:
    a filter body formed of a material permeable to gas and impermeable to oil through which the vapors pass, the at least one filter body being disposed within the canister and being at least partially surrounded by the coil member.

5. The device of claim 1, further comprising:
    a sleeve disposed between an inner surface of the canister and the coil member, the sleeve at least partially surrounding the coil, wherein vapors being drawn through the inlet port impinge upon the sleeve so that oil in said vapors condenses thereon.

6. The device of claim 1, further comprising:
    at least one filter body formed of material permeable to gas and impermeable to oil through which the vapors pass, the at least one filter body being disposed within the canister.

7. The device of claim 1, further comprising:
    a second coil member supported within the canister upon which the vapors impinge so that oil in the vapors condenses thereon.

8. The device of claim 1, further comprising:
    a tubular member extending from a proximate end of the sealed canister to a distal end of the sealed canister, the tubular member being formed with a surface through which at least some of the vapors flow.

9. The device of claim 1, further comprising:
    a flow equalization member for maintaining an air to fuel stoichiometric ratio, the flow equalization member being connected to the outlet port and having openings disposed thereon and through which at least some of the vapors are drawn, wherein the flow equalization member has a diameter of about that of an inner diameter of a PCV valve connecting the inlet port to the PCV system.

10. The device of claim 1, further comprising:
    a cooling mechanism for cooling the device relative to the vapors.

11. The device of claim 1, wherein the canister comprises vacuum tight seals to facilitate vacuum tight integrity.

12. The device of claim 1, wherein the inlet port is transverse to the coil member and the outlet port is coaxial with the coil member so that vapors are drawn inwardly through a circumference of the coil member and towards the outlet port.

13. An engine system comprising:
    a crankcase holding trapped vapors comprising deleterious matter;
    an intake manifold for drawing the vapors from the crankcase; and
    a vapor purifier having an inlet port communicating with an interior of the vapor purifier and an outlet port through which cleansed air is output from the vapor purifier, the vapor purifier configured to intake the vapors drawn from the crankcase through the inlet port and to output cleansed air to the intake manifold through the outlet port, the vapor purifier having a coil member disposed therein and being spaced apart from the inlet port such that the vapors drawn into the interior of the vapor purifier impinge on an outer surface of the coil member to condense oil in the vapors thereon, the coil member having a tubular structure with an internal surface and an external surface, the tubular structure having an entry point through which the vapors are drawn and an exit point out of which at least some of the vapors flow, the entry point and the exit point being in communication with the interior of the canister and being spaced apart from the inlet port.

14. The system of claim 13, wherein the coil member is configured so that at least a portion of the vapors drawn into the interior of the canister flow through the entry point of the coil member and impinge upon the internal surface of the coil member to condense oil in the vapors thereon.

15. The system of claim 13, wherein the vapor purifier further comprises:
a sleeve disposed between an inner surface of the canister and the coil member, the sleeve at least partially surrounding the coil, wherein the vapors impinge on the sleeve so that oil in said vapors condenses thereon.

16. The system of claim 13, wherein the vapor purifier further comprising:
at least one filter body formed of a material permeable to gas and impermeable to oil through which the vapors pass, the at least one filter body being disposed within the canister.

17. The system of claim 13, wherein the inlet port is transverse to the coil member and the outlet port is coaxial with the coil so that vapors are drawn inwardly through a circumference of the coil member and towards the outlet port.

18. A method of removing deleterious matter from vapors of an engine in a Positive Crankcase Ventilation (PCV) system comprising:
drawing the vapors into an interior of the vapor purifier, the vapors impinging upon an outer surface of a coil member in the vapor purifier, the coil member having a tubular structure with an entry point and an exit point being spaced apart from an inlet port of the vapor purifier;
condensing oil in the vapors on the outer surface of the coil member when the vapors impinge upon the outer surface of the coil member to cleanse the vapors;
pulling the vapors from the interior of the vapor purifier through the entry point of the coil member based on an indirect vacuum effect;
impinging the vapors upon an internal surface of the coil member so that oil in the vapors condenses on the internal surface;
draining the oil from the vapor purifier into a crankcase of the engine for reuse; and
pulling the cleansed air from the vapor purifier through an outlet port, the cleansed air being mixed with fuel for combustion 19. The method of claim 18, further comprising:
controlling a normal engine intake manifold pressure to maintain a stoichiometric ratio of air to fuel for combustion.

20. The method of claim 18, further comprising:
pulling the vapors through at least one filter body disposed in the vapor purifier, the at least one filter body formed of a material permeable to gas and impermeable to oil through which the vapors pass.

21. The method of claim 18, wherein the inlet port is transverse to the coil member and the outlet port is coaxial with the coil member so that vapors are drawn inwardly through a circumference of the coil and towards the outlet port.

* * * * *